(12) United States Patent
Dearing et al.

(10) Patent No.: US 7,669,764 B2
(45) Date of Patent: Mar. 2, 2010

(54) SYSTEMS AND METHODS FOR AUTOMATED RECONCILIATION OF MAIL ENTRY OPERATIONS

(75) Inventors: Stephen M. Dearing, Cordova, TN (US); Gerald J. Jamula, New Boston, MI (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 11/518,993

(22) Filed: Sep. 12, 2006

(65) Prior Publication Data

US 2007/0080221 A1  Apr. 12, 2007

Related U.S. Application Data

(60) Provisional application No. 60/715,573, filed on Sep. 12, 2005.

(51) Int. Cl.
*G06F 19/00* (2006.01)
*G06F 17/00* (2006.01)

(52) U.S. Cl. ...................................... 235/385; 235/375

(58) Field of Classification Search ................. 235/385, 235/383, 375, 380, 382, 472.01–472.03
See application file for complete search history.

(56) References Cited

U.S. PATENT DOCUMENTS

| | | | | |
|---|---|---|---|---|
| 5,586,036 A | * | 12/1996 | Pintsov | 705/408 |
| 6,430,543 B1 | * | 8/2002 | Lee et al. | 705/60 |
| 6,547,137 B1 | * | 4/2003 | Begelfer et al. | 235/385 |
| 2004/0188522 A1 | * | 9/2004 | Ashaari | 235/385 |
| 2004/0249652 A1 | | 12/2004 | Aldstadt | |
| 2007/0078793 A1 | * | 4/2007 | Dearing et al. | 705/401 |

* cited by examiner

*Primary Examiner*—Thien M Le
(74) *Attorney, Agent, or Firm*—Finnegan, Henderson, Farabow, Garrett & Dunner, LLP

(57) ABSTRACT

Systems and methods are provided for reconciling data associated with delivery items, such as mail. In one embodiment, a computer-implemented method reconciles data associated with a delivery item shipment. The method includes the steps of receiving a first set of data associated with the shipment, and electronically receiving a second set of data associated with the shipment. The method further includes the steps of scanning the shipment during processing for scanned data associated with the shipment and determining if the first set of data matches the second set of data. If the first or second set of data matches the second set of data, the method determines if the second set of data matches the scanned data. If the first or second set of data matches the scanned data, the method indicates both the first set of data and the second set of data as valid.

20 Claims, 11 Drawing Sheets

The following table provides the name, description, and required format of each data element in a single EMD file record.

*Indicates that populating the field is optional.

EMD Shipment Elements

| Position | Field | Length/Format | Description |
|---|---|---|---|
| 1. | Shipment ID | 20/Alphanumeric<br><br>UT000012345000001238<br>- Service Type Code (2 characters)<br>- EMD Creator's D-U-N-S Number (9 digits)<br>- Sequential Shipment ID (8 digits)<br>- Check Digit (1 digit) | Unique barcode ID for an individual shipment. The Shipment ID is comprised of the following components:<br>■ The Service Type Code identifies the type of service the Postal Service is providing by scanning the barcode. A Service Type Code of "UT" must be used in order to identify shipments and receive the Entry and Acceptance scans.<br>■ The Creator D-U-N-S Number of the EMD is the D-U-N-S Number of the party creating the EMD.<br>■ The Sequential Shipment ID allows the customer to create unique 20 character Shipment IDs. This value should be padded with leading 0s to 8 digits.<br>■ The Check Digit is required in the last position of the barcode data for all barcodes and is used to detect errors resulting from manual data entry or data transmission errors. See appendix C for details on calculating the check digit.<br><br>*Note:* The Shipment ID will be used as the data content for a USS Code 128 barcode to be affixed to the PS Form 8125 for plant-verified drop shipments or the PS Form 3152-A for bulk mailings accepted and verified at a BMEU. The Shipment ID must remain unique for a period of 1 year (i.e., do not use the same Shipment ID on different shipments for at least 1 year).<br><br>For Consolidators: The creator's D-U-N-S Number in the Shipment ID will be the consolidator's own 9-digit D-U-N-S Number (issued by Dun and Bradstreet www.dnb.com). |
| 2. | Mailer's D-U-N-S Number | 9/Alphanumeric | The 9-digit D-U-N-S Number (issued by Dun and Bradstreet) of the party preparing the shipment.<br><br>*Note:* The D-U-N-S Number must be composed of numeric values. All other characters will not be accepted. |

FIG. 2A

| Position | Field | Length/Format | Description |
|---|---|---|---|
| 3. | Drop Location Facility ZIP Code | 5/Alphanumeric | ZIP Code of the Postal Service facility where mail in this shipment is dropped (e.g., Northern VA P&DC = 22081). Mail dropped at additional facilities represents separate shipments and should have separate PS Forms with attached barcodes.<br>*Note:* The ZIP Code must be composed of numeric values. All other characters will not be accepted. |
| 4. * | Drop Location Facility Type Code | 1/Alpha | Code to represent drop facility type:<br>B  BMC<br>D  DU<br>A  ASF<br>S  SCF<br>M  AMF<br>O  Origin<br>I  ISC<br>T  Other |
| 5. * | DSAS Appointment Number | 12/Alphanumeric | DSAS appointment number applicable to this shipment where required (from PS Form 8125, assigned by DSAS). |
| 6. * | Transportation Owner's D-U-N-S Number | 9/Alphanumeric | The 9-digit D-U-N-S Number (issued by Dun and Bradstreet) of the company responsible for physical shipment. If the transportation company is also the mailing company this field should be left as null.<br>*Note:* The D-U-N-S Number must be composed of numeric values. All other characters will not be accepted. |
| 7. | Drop Date | 8/Numeric, MMDDYYYY | Estimated date the mail is to be dropped at the Postal Service facility. All date field values should be padded with leading 0s (if needed) to preserve the MMDDYYYY format (i.e., January 1, 2003 should be written as 01012003). |
| 8. * | DSAS Appointment Time | 4/Numeric, HHMM | Estimated time the mail is to be dropped at the Postal Service facility.<br>*Note:* Time is written in 24-hour notation.<br>All time field values should be padded with leading 0s (if needed) to preserve the HHMM format (i.e., 2.30am should be written as 0230). |

FIG. 2B

EMD Mailing Elements

| Position | Field | Length/Format | Description |
|---|---|---|---|
| 9. | Mail Owner's Job Number | 20/Alphanumeric | A unique ID that represents a mailing. This is the initiating company's ID of the mailing. This ID should remain unique for at least 6 months. Please do not pad this with leading 0s.<br>*Note:* If the record (row) has PLANET Code data, then this value cannot be over 8 digits long (and must be numeric). |
| 10. | Mailing Name | 50/Alphanumeric | Descriptive text for mailing. Please do not pad this with leading 0s. |
| 11.* | Mail Owner's D-U-N-S Number | 9/Alphanumeric | The 9-digit D-U-N-S Number (issued by Dun and Bradstreet) of the originating mail owner.<br>*Note:* The D-U-N-S Number must be composed of numeric values. All other characters will not be accepted. |
| 12.* | Mailer's Job Number | 20/Alphanumeric | A non-mail owner's unique job ID to represent a subset of the mail owners mailing. This ID should remain unique for at least 6 months. Please do not pad this with leading 0s. |
| 13.* | Mail Class Code | 1/Numeric | Mail Class Code:<br>1 First-Class Mail<br>2 Periodicals<br>3 Standard Mail<br>4 Package Services<br>5 Express Mail<br>6 International<br>9 Other |
| 14.* | Mail Type Code | 2/Alpha | Mail Type Code:<br>LT Letter<br>FL Flat<br>IR Irregular parcel<br>CD Card<br>MP Machinable Parcel<br>AC Automation Compatible<br>NP Nonmachinabe Parcels |
| 15.* | Presort Level | 3/Numeric | Predominant CIN (Content Identifier Number) of the mailing. |
| 16.* | In Home Delivery Start Date | 8/Numeric, MMDDYYYY | The first day of the in-home delivery window.<br>All date field values should be padded with leading 0s (if needed) to preserve the MMDDYYYY format (i.e., January 1, 2003 should be written as 01012003). |

FIG. 2C

| | | | |
|---|---|---|---|
| 17.* | In Home Delivery End Date | 8/Numeric, MMDDYYYY | The last day of the in-home delivery window. All date field values should be padded with leading 0s (if needed) to preserve the MMDDYYYY format (i.e., January 1, 2003 should be written as 01012003). |
| 18.* | Permit Account Number | 8/Alphanumeric | PERMIT Account Number of the party responsible for paying the Postal Service for the mailing. |
| 19.* | Permit ZIP Code | 9/Alphanumeric | ZIP Code where Permit Account Number is applicable. *Note:* The ZIP Code must be composed of numeric values. All other characters will not be accepted. |
| 20. | Piece Count of the Mailing | 9/Numeric | Total piece count for this entire mailing (Mail Owner's Job Number) regardless of what piece count is on the shipment. For example, if Mailing X has 1,000,000,000 pieces, 250,000 of which are on the shipment, then field 20 should have the value 1,000,000,000. |

EMD Drop Elements

| Position | Field | Length/Format | Description |
|---|---|---|---|
| 21. | Piece Count of Mailing on the Shipment | 9/Numeric | Estimated pieces of a mailing associated with a shipment. This is a separate element than shipment and mailing and is used to support the following scenarios:<br>■ One mailing can be on many shipments.<br>■ Many mailings can be on one shipment.<br>Therefore, the drop itself cannot be consistently attributed to either a mailing or a shipment, but rather links mailings and shipment together.<br>For example, if Mailing X has 1,000,000,000 pieces, 250,000 of which are on the shipment, then field 21 should have the value 250,000. |

FIG. 2D

EMD PLANET Code Elements

| Position | Field | Length/Format | Description |
|---|---|---|---|
| 22.* | PLANET Code | 13/Numeric | PLANET Code on these particular mail pieces. If there are multiple PLANET Codes used in one mailing then a new row will be created in the EMD for each PLANET Code in the mailing.<br>The PLANET Code cannot be less than 11 digits.<br>PLANET Code data should only be included in the EMD if the file is submitted via FTP.<br>If a PLANET Code is provided, then the Number of Mail Pieces PLANET Coded (element 23) must also be provided.<br>Do not pad with leading 0's. |
| 23.* | Number of Mail Pieces PLANET Coded | 9/Numeric | Pieces of mail that are tagged with this PLANET Code for the given drop.<br>PLANET Code data should only be included in the EMD if the file is submitted via FTP.<br>If the Number of Mail Pieces PLANET Coded is provided, then the PLANET Code (element 22) must also be provided.<br>Do not pad with leading 0s. |

EMD Version Elements

| Position | Field | Length/Format | Description |
|---|---|---|---|
| 24. | EMD Version | 9/Alphanumeric | The version number of the EMD specification that was used when the file was created. For this version of the EMD, the value that should be used in this field is: 4.0 |

FIG. 2E

Additional EMD Shipment Elements

| Position | Field | Length/Format | Description |
|---|---|---|---|
| 25.* | Origin Plant Location | 9/Numeric | ZIP Code of the mailer's origin plant. |
| 26.* | Identical-/Nonidentical-Weight Pieces | 1/Alpha | Populate with an "I" to indicate that the shipment contains identical-weight pieces. Populate with an "N" to indicate that the shipment contains nonidentical-weight pieces. |
| 27.* | Single Piece Weight | 10/Alphanumeric | Weight of a single piece (in pounds). *Note:* This field must be populated if the shipment is indicated to have identical-weight pieces. The field must not be populated if the shipment is indicated to have nonidentical-weight pieces. If the single-piece weight is less than 1 pound, please include decimal point. Values may be written with or without a leading zero (i.e., 0.01 or .01). |
| 28.* | Total Gross Weight | 10/Alphanumeric | Total gross weight of drop (verified at origin office). |
| 29.* | Number of Pallets Containing Packages | 5/Numeric | Total number of pallets containing packages for the given drop. |
| 30.* | Number of Pallets Containing Trays | 5/Numeric | Total number of pallets containing trays for the given drop. |
| 31.* | Number of Pallets Containing Sacks | 5/Numeric | Total number of pallets containing sacks for the given drop. |
| 32.* | Number of Pallets Containing Parcels | 5/Numeric | Total number of pallets containing parcels for the given drop. |
| 33.* | Number of Non-Palletized Containers Containing Packages | 5/Numeric | Total number of nonpalletized containers containing packages for the given drop. |
| 34.* | Number of Non-Palletized Containers Containing Trays | 5/Numeric | Total number of nonpalletized containers containing trays for the given drop. |
| 35.* | Number of Non-Palletized Containers Containing Sacks | 5/Numeric | Total number of nonpalletized containers containing sacks for the given drop. |

FIG. 2F

| Position | Field | Length/Format | Description |
|---|---|---|---|
| 36.* | Number of Non-Palletized Containers Containing Parcels | 5/Numeric | Total number of nonpalletized containers containing parcels for the given drop. |
| 37.* | Number of Non-Palletized Containers Containing Others | 5/Numeric | Total number of nonpalletized containers containing others for the given drop. |
| 38.* | Origin Post Office | 9/Numeric | ZIP Code of Post Office where acceptance occurs. |
| 39.* | Verification Location | 1/Alpha | Verification Location Code:<br>D  DMU<br>B  BMEU or Post Office |
| 40.* | Postage Payment Method | 1/Alpha | Postage Payment Method Code:<br>P  Permit<br>S  Stamps<br>M  Meter |
| 41.* | Total Weight of Mailing | 10/Alphanumeric | Total weight of the mailing included for the given drop. |
| 42.* | Vehicle PVDS Seal Number | 20/Alphanumeric | PVDS seal number of the vehicle transporting shipment. |
| 43.* | Vehicle ID Number | 20/Alphanumeric | Identification number of the vehicle transporting shipment. |
| 44.* | USPS Employee Verifying Mail | 50/Alphanumeric | The name of the Postal Service employee verifying the shipment at the point of acceptance. |
| 45.* | Employee's Phone Number | 12/Alphanumeric | The phone number of the Postal Service employee verifying the shipment at the point of acceptance |
| 46.* | USPS Contact Name | 50/Alphanumeric | The name of the Postal Service point of contact for the mailer (if different than the employee verifying the shipment at the point of acceptance. |
| 47.* | USPS Contact Phone Number | 12/Alphanumeric | The phone number of the Postal Service employee verifying shipment at the point of acceptance. |
| 48.* | Comments | 100/Alphanumeric | Any specific comments related to the shipment. |

FIG. 2G

EMD Bundle Elements

| Position | Field | Length/Format | Description |
|---|---|---|---|
| 49.* | Bundle ID Barcode | 20/Alphanumeric | The barcode on the particular bundle(s). The Bundle ID barcode is comprised of the following components:<br>■ The Service Type Code identifies the type of service the Postal Service is providing by scanning the barcode. A Service Type Code of "UB" must always be used for bundle tracking.<br>■ The Mailer's Reference ID is the unique ID assigned to each mailer for bundle tracking.<br>■ The Sequential Bundle ID allows the customer to uniquely identify each bundle on a given container.<br>■ The Check Digit is required in the last position of the barcode data for all barcodes and is used to detect errors resulting from manual data entry or data transmission errors. See appendix C for details on calculating the check digit.<br>*Note*: The Bundle ID barcode will be used as the data content for a USS Code 128 Barcode to be affixed to a facing slip or peelable label that is attached to a bundle. Once a Bundle ID barcode is used, it cannot be used again for a period of 6 months.<br>If there are multiple Bundle ID barcodes used in one shipment then a new row will be created in the EMD for each unique combination of:<br>■ Bundle ID barcode<br>■ Destination ZIP Code<br>■ Destination carrier route<br>*Note*: A Bundle ID barcode can be:<br>■ Unique for each bundle<br>■ Generic within a drop (i.e., part of one mailing on one shipment)<br>■ Generic within a mailing |
| 50.* (Conditionally required) | Destination ZIP Code | 5/Numeric | ZIP Code the bundle will be delivered in.<br>*Note*: If Bundle ID barcode (field 49) is populated, then this field must be populated. |
| 51.* | Destination Carrier Route Number | 4/Alphanumeric | Carrier route the bundle will be delivered in. |

FIG. 2H

| Position | Field | Length/Format | Description |
|---|---|---|---|
| 52. *<br>(Conditionally required) | Number of Bundles Barcoded | 9/Numeric | The number of bundles that are tagged with this Bundle ID barcode for the given destination ZIP Code and destination carrier route.<br><br>*Note:* If Bundle ID barcode (field 49) is populated, then this field must be populated.<br><br>If unique Bundle ID barcodes are used, then there will only be one bundle for each Bundle ID barcode so this value will be 1.<br><br>If unique Bundle ID barcodes are not used then the same Bundle ID barcode can be placed on different bundles. If the mailer only knows the bundle information to the 5-digit level (i.e., destination carrier route field will be unpopulated), then the value for this field would be the number of bundles with the given Bundle ID barcode destined for the given ZIP Code. If the mailer knows the bundle information to the carrier route level (i.e., the carrier route is populated in the EMD), then the value for this field would be the number of bundles with the given Bundle ID barcode destined for the given destination ZIP Code and destination carrier route combination (i.e., destined for the specific carrier). |
| 53. * | Piece Count of the Coded Bundle(s) | 9/Numeric | The piece count for the bundle(s) with this Bundle ID barcode for the given destination ZIP Code (and destination carrier route if it is populated).<br><br>If unique Bundle ID barcodes are used, then the value for this field will be the piece count for the one bundle that has the given Bundle ID barcode.<br><br>If unique Bundle ID barcodes are not used, then the value for this field will be the cumulative piece count of all the bundles containing the same Bundle ID barcode for the given destination ZIP Code (and destination carrier route if it is populated). For example, if two bundles have the same Bundle ID barcode (and those bundles are destined for the same carrier), then the value for this field will be the sum of the piece count of both of those bundles. |
| 54. * | Number of non-Barcoded Bundles | 9/Numeric | The number of bundles that are not barcoded for the given destination ZIP Code (and destination carrier route if it is populated). |
| 55. * | Piece Count of the non-Barcoded Bundles | 9/Numeric | The piece count of bundle(s) that are not barcoded for the given destination ZIP Code (and destination carrier route if it is populated). |

*Indicates that populating the field is optional.

FIG. 2J

US 7,669,764 B2

SYSTEMS AND METHODS FOR AUTOMATED RECONCILIATION OF MAIL ENTRY OPERATIONS

RELATED APPLICATION

This application claims the benefit of priority from U.S. Provisional Application No. 60/715,573, entitled "Mailer Point of Entry Reconciliation Performance," filed Sep. 12, 2005, the disclosure of which is expressly incorporated herein by reference in its entirety.

BACKGROUND

I. Technical Field

The present invention relates to methods and systems in the field of automated reconciliation of mail entry operations. More particularly, the present invention relates to methods and systems for tracking and monitoring entry locations of delivery items, such as mail, and validating and reconciling data associated with the delivery items.

II. Background Information

The UNITED STATES POSTAL SERVICE (USPS), an independent establishment of the United States government, is a mail delivery provider that handles billions of pieces of mail on a weekly basis. Mail delivery providers such as the USPS charge postage fees to mailers in order to cover the cost for handling and shipping the mail. Under certain circumstances, a mail delivery provider may discount the postage for mailers that reduce the providers handling and shipping costs for large quantities of mail.

For example, there are several methods available that allow mailers to better prepare the mail in order to receive a discount on the postage. One such method for the mailer is to deliver pre-sorted mail to a USPS mail processing facility. Additional discounts are available to mailers if the mailers "drop-ship" their pre-sorted mail by delivering the mail to a USPS mail processing facility that is nearest to the mail's delivery destination. Drop-ship saves the USPS some of the initial handling, sorting, and transporting costs associated with the mail, which allows the USPS to pass on the savings, in the form of discounts, to the drop-ship mailers.

Mailers that wish to receive the drop-ship discount must first submit a PS Form 8125. The PS Form 8125 allows the mailer to identify the volume of mail and the drop-ship location. Based on the information provided by the mailer in its PS Form 8125, the USPS prepares a proper credit and/or debit from the mailer's customer account. For example, if a mailer indicates in its PS Form 8125 that the mailer is drop-shipping one thousand FIRST-CLASS MAIL letters in four sacks at a specific location for the USPS to deliver, the USPS charges the mailer's customer account at a discounted rate based on the information provided by the mailer in its PS Form 8125. In this example, instead of charging $370.00 to the mailer's customer account at the full first class mail rate of 37 cents per letter, the USPS charges $320.00 to the mailer's customer account, that is, a discounted rate of 32 cents per letter.

A USPS mail processing facility that accepts the mailer's drop-ship shipment will check the shipment against information provided in the mailer's PS Form 8125. However, on many occasions, the processing facility is only able to spot check mail pieces in the mailer's shipment and count the number of mail containers (e.g., pallets, bags, bundles, or sacks). Frequently, the processing facility is unable to count or inspect each mail piece or evaluate whether the drop-ship location is the optimal drop-ship location to the USPS. Accordingly, mail delivery service providers, such as the USPS, are unable to verify the accuracy of the information provided by the mailer and must instead rely upon the mailer's accuracy. Therefore, there is a need for systems and methods that enable the verification of the accuracy of the information provided by mailers. In particular, there is a need for systems and methods that track and monitor entry locations of mail and validate and reconcile data provided by mailers with the mail.

SUMMARY

Consistent with an embodiment of the present invention, a computer-implemented method is provided that reconciles data associated with a delivery item shipment. The method may comprise receiving a first set of data associated with the shipment; electronically receiving a second set of data associated with the shipment; and scanning, during processing, the shipment for data associated with the shipment. The method may further comprises steps of determining if the first set of data matches the second set of data and if the first set of data matches the second set of data, determining if the first or second set of data matches the scanned data. If the first or second set of data matches the scanned data, the method may indicate as valid the first set of data and the second set of data.

Consistent with another embodiment of the present invention, a system is provided for reconciling data associated with a delivery item shipment. The system may comprise a server that may store in a database a first set of data associated with the shipment. The server may receive a second set of data associated with the shipment from a mailer computer. Processing equipment may scan, during processing, the shipment for data associated with the shipment. The server may further determine if the first set of data matches the second set of data and if the first set of data matches the second set of data, determine if the first or second set of data matches the scanned data. If the first or second set of data matches the scanned data, the server may indicate as valid the first set of data and the second set of data.

Consistent with yet another embodiment of the present invention, a computer-readable medium stores program instructions for reconciling data associated with a shipment according to the above-described method.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings:

FIGS. 2A-H and 2J illustrate various elements of an exemplary Electronic Mailing Data ("EMD") file specification, consistent with the present invention.

DESCRIPTION OF THE EMBODIMENTS

Reference will now be made in detail to present embodiments of the invention, examples of which are illustrated in the accompanying drawings. Wherever possible, the same reference numbers will be used throughout the drawings to refer to the same or like parts.

Figure 1:
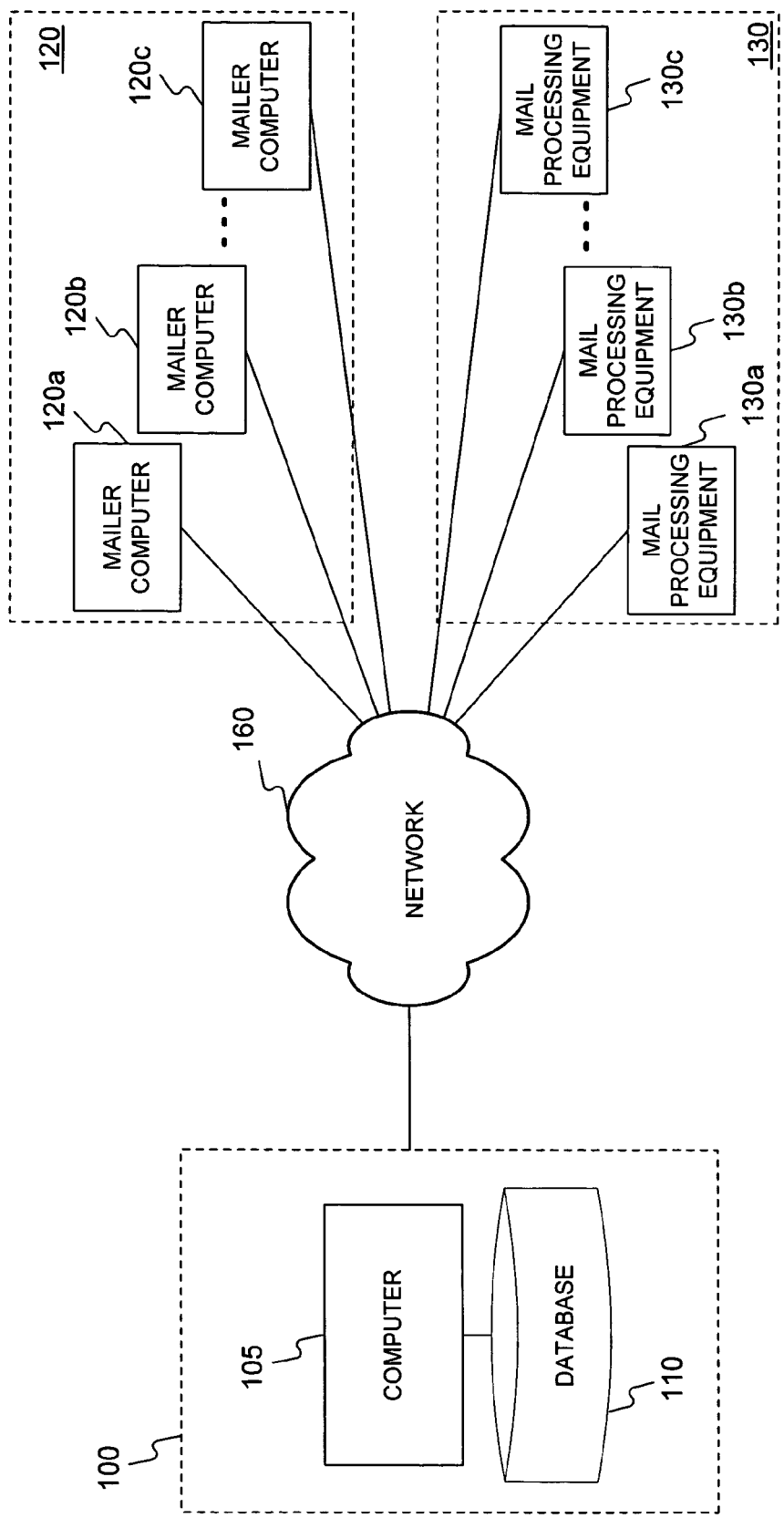
FIG. 1 is a block diagram of an exemplary system environment for tracking and monitoring entry locations of delivery items and validating and reconciling data associated with the delivery items, consistent with the present invention.

FIG. 1 is a block diagram of an exemplary system 10, consistent with the present invention. Components of system 10 may be adapted to track and monitor entry locations of delivery items and validate and reconcile data associated with the delivery items. As shown in FIG. 1, system 10 includes a server 100, mailer computers 120a-n, and mail processing equipment 130a-n, which are connected to network 160. Server 100 may include a computer 105 and a database 110. One of skill in the art will appreciate any number of mailer computers and/or mail processing equipment may be provided. Further, one of ordinary skill in the art will recognize that functions provided by one or more components of system 10 may be combined.

Data associated with delivery items, such as mail, may originate from one or more mailer computers 120 and one or more mail processing equipment 130. Each of mail processing equipment 130a-n refers to equipment at mail processing facilities that processes one or more mailpieces when the mail is en route from a source to a destination, and the equipment may perform one or more functions on the mail when the equipment reads a certain code for the mail. For example, the equipment may scan for data associated with the mail, route the mail according to the data associated with the mail, and/or send the data associated with the mail to a computer (e.g., computer 105 in server 100, which may also include a database 110 for storing data.

An example of such mail processing equipment is the Advanced Facer Canceller System ("AFCS") used by USPS. The AFCS includes software for reading optically-readable codes (e.g., 4-state barcode, PLANET code, POSTNET code, and the like) on individual pieces of mail. For example, a 4-state barcode includes sorting, tracking, service, and customer information in a single barcode. When processing a piece of mail, if the AFCS reads a particular optically-readable code, the AFCS may generate an image of the mail and extract data associated with the mail using imaging software (e.g., optical character recognition software). AFCS may include an interface for communicating with network 160 to send data associated with the mail to server 100 for data processing.

Data associated with a mailpiece may include, for example, information derived from a hard copy form, such as a PS Form 8125, and Electronic Mailing Data ("EMD") files submitted by mailers via mailer computers 120a-n, as well as scan data from mail processing equipment 130a-n. Scan data from mail processing equipment 130a-n includes information scanned from an optically readable code associated with the mail (e.g., 4-state barcode, PLANET code, POSTNET code, and the like) that is used by a tracking system (e.g., USPS's CONFIRM service) for monitoring and tracking mail. Scan data may include, for example, the shipment ID, Business Entity Identifier (or mailer ID), destination postal code (such as the ZIP CODE), date, time, and/or name of the mail processing facility. USPS's CONFIRM service allows mailers to uniquely identify and track both outgoing and incoming mail. CONFIRM service provides mailers with near real-time tracking information for FIRST-CLASS MAIL letters and other material, STANDARD MAIL letters and other material, PERIODICALS MAIL letters and other material, and automation-compatible letters, material, and flats. CONFIRM service also provides the mailers with information regarding the mail, such as the date and time of induction at the USPS, date and time of processing, location of processing, sort operation of processing, and barcode data (e.g., PLANET code, POSTNET code, and the like).

To use the USPS's CONFIRM service, a mailer submits an EMD file that identifies the mailer's ID number (subscriber number) and the PLANET code range for mail tracking. An EMD file is described in greater detail below and in FIGS. 2A-H and 2J. Data from mailer computers 120a-n and mail processing equipment 130a-n may be sent to server 100 via network 160.

Detailed information regarding the PLANET code and CONFIRM service is disclosed, for example, in the commonly assigned U.S. Patent Application Publication No. 2004/0249652 A1 to Aldstadt et al. and entitled "Item Tracking and Anticipated Delivery Confirmation System and Method," which is incorporated herein by reference in its entirety.

As will be appreciated by those skilled in the art, the number and orientation of the components illustrated in FIG. 1 are merely examples and do not limit the scope of the invention. Therefore, other arrangements and sets of components are feasible, consistent with the principles of the invention. Further, it is noted that any combination of the components in system 10 may be owned and operated by a mail delivery service provider (e.g., USPS). Moreover, several of the components (such as mailer computers 120a-120n) may be third-party owned and/or operated for the purposes of providing data and/or otherwise facilitating mail entry location tracking and monitoring and validating and reconciling data associated with the mail.

As described above, mailer computers 120a-120n may serve as source systems for providing data associated with the mail, such as information derived from PS Form 8125 and EMD files. For example, data derived from PS Form 8125 and/or EMD files may be stored in database 110. Further, data associated with the mail may be provided by mailer computers 120a-120n and may be stored in database 110. Examples of mailer computers 120a-n include computing devices or platforms (e.g., computers, laptops, servers, mainframes, and the like) that may be used by individuals, companies, organizations, or any entities that provide mail to the mail delivery institution for processing and delivery.

Server 100 may comprise a general purpose computer (e.g., a personal computer, network computer, server, or mainframe computer) having a processor (not shown) that may be selectively activated or reconfigured by a computer program (not shown). Server 100 may also be implemented in a distributed network. Alternatively, server 100 may be specially constructed for carrying-out methods consistent with a particular embodiment. Accordingly, server 100 may include software-based logic (not shown) for tracking and monitoring entry locations of mail and validate and reconcile data provided by mailers with the mail.

In operation, server 100 receives data from the various data sources in system 10, such as from mailer computers 120a-120n and mail processing equipment 130a-130n. The received data may be filtered, mapped, and/or otherwise processed prior to analysis by computer 105 or storage in database 110. Such processing may normalize the data and catch exceptions or errors. Subsequent to the processing of data associated with the mail, computer 105 may track and monitor an entry location of the mail and validate and reconcile data associated with the mail and allows the USPS to track back to entry source data, such as a mailer.dat file provided by a mailer.

In addition to mailer computers 120a-120n, the components shown in FIG. 1, including server 100 and mail processing equipment 130a-130n, may comprise computing devices or platforms. By way of example, each of such computing devices may include a central processing unit (CPU), a disk drive, a memory, and a network access device. Further, server 100 may be embodied as a central server (as represented in FIG. 1) or any number of distributed servers (not shown), and may comprise software applications or modules for implementing computer 105 and database 110.

Database 110 may comprise any medium for storing information, such as a magnetic or optical storage medium. In one embodiment, database 110 stores information that can be accessed through a conventional database protocol, such as Structured Query Language ("SQL"). Examples of database 110 include, but are not limited to, an Oracle relational database management system, a Microsoft SQL Server, and Sybase SQL Server.

The CPU of a computing device may be any appropriate processor or set of processors for executing program instructions. Memory may be RAM or any another permanent, semi-permanent, or temporary storage device, including ROM and flash memory. Disk drives may comprise a hard disk drive, an optical drive, or any other type of data storage device.

The network access device of a computing device may be a modem, a cable modem, an Ethernet card, a T1 line connector, or any other access device for connecting a respective system component (e.g., server 100, mailer computers 120, mail processing equipment 130) to another system component or connecting a respective system component directly to network 160.

Network 160 provides communications between the various entities in system 10, such as server 100, mailer computers 120, and mail processing equipment 130. In addition, server 100, mailer computers 120, and mail processing equipment 130 may access legacy systems (not shown) via network 160, or may directly access legacy systems and/or databases. Network 160 may be a shared, public, or private network, may encompass a wide area or local area, and may be implemented through any suitable combination of wired and/or wireless communication networks. Furthermore, network 160 may comprise a local area network (LAN), a wide area network (WAN), an intranet, or the Internet. Conventional protocols and encryption methods may be used for electronically transmitting data over network 160. For example, HyperText Transfer Protocol ("HTTP") and File Transfer Protocol ("FTP") may be used for data transfers, and encryption may be achieved through secure file transfer protocol or secure copy.

Although not shown, each of the computing devices in FIG. 1 may be connected to one or more input devices, such as a keyboard, a mouse, or some other type of means for inputting data to computing device. Further, each of the computing devices may be connected to one or more display devices, such as a monitor or any other visual and/or audio-visual output device.

FIGS. 2A-H and 2J illustrate various elements of an exemplary EMD file, consistent with principles of the present invention. An EMD file is a single data text file having comma-delimited fields in a flat file format. Each record in the EMD file is made up of a single row of data consisting of multiple data fields (e.g., 55). An entry is required in mandatory data fields and optional in optional data fields. If an entry is not provided for an optional data field, the optional data field indicates a null value indicated by two commas adjacent to each other. The EMD file contains data for one or more shipments. A shipment contains one or more mailings, and a mailing can have zero, one, or many PLANET codes. A mailer electronically provides an EMD file to the USPS as pre-shipment notification, the EMD file containing information about the mailer's upcoming shipments and mailings. In the EMD file, the mailer describes several characteristics of its planned mailing (e.g., drop-ship sites, shipment and mailing identification, expected date and time, Shipment ID barcodes, and the like) that will be used on USPS induction forms to track the mailing. When the mailer drops the mailing with the USPS, the USPS scans the mailing's induction forms to start a clock for tracking the mailing.

If the mailer is a subscriber of the CONFIRM service, the mailer's EMD file may also indicate PLANET Codes that will be used on the mail for piece-level tracking. A single EMD file must be created for each shipment. The mailer may create an EMD file by manually entering the relevant mailing data through Mail Tracking & Reporting Web site provided by the USPS. The mailer may also create an EMD file containing the necessary data in accordance with EMD file specifications (e.g., EMD specification shown in FIGS. 2A-H and 2J), then upload the EMD file to the USPS using a digital protocol (e.g., HTTP, FTP, and the like).

A corresponding shipment barcode may be added to a shipping notice (e.g., PS Form 8125) which accompanies the shipment. When the shipment ID barcode is scanned at a USPS entry facility, the shipment ID is matched to data derived from the EMD file, and a notification regarding the shipment is provided to the mailer (either by email and/or file transfer).

Figure 3:
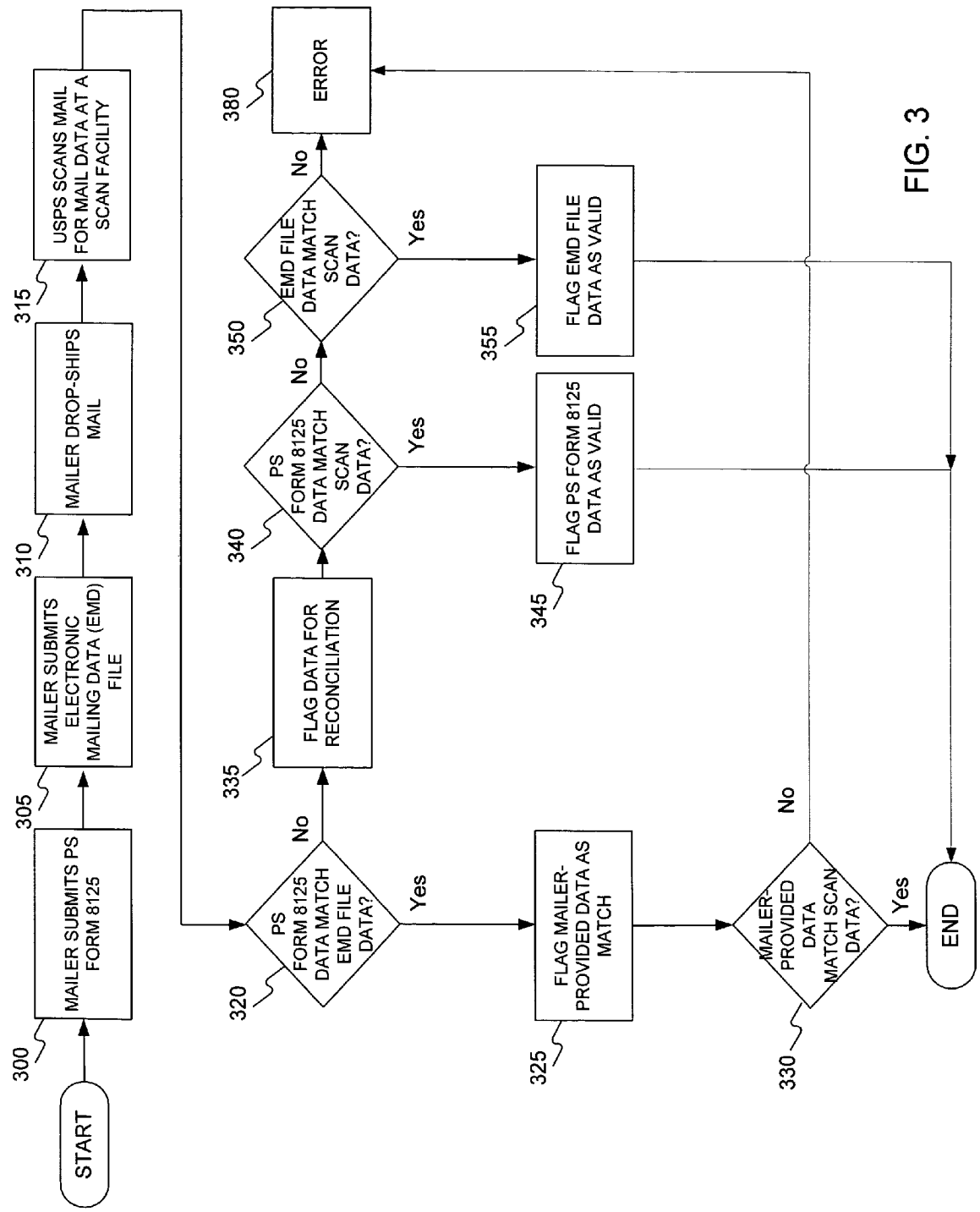
FIG. 3 is a flow diagram of an exemplary process for tracking and monitoring entry locations of delivery items and validating and reconciling data associated with the delivery items, consistent with the present invention.

FIG. 3 is a flow diagram of an exemplary process for tracking and monitoring an entry location of delivery items and validating and reconciling data associated with the delivery items, consistent with the present invention. The flow diagram will be described with references to exemplary system 10 as shown in FIG. 1.

In step 300, a mailer submits a shipping notice (e.g., PS Form 8125) to a mail delivery server provider, such as the USPS. The shipping notice includes data associated with its shipment of delivery items, such as mail. The mailer may submit PS Form 8125 data electronically or via hardcopy. The PS Form 8125 data is converted into electronic text, if necessary, and uploaded into server 100 for storage in database 110. The electronic text identifies the mailer's ID, drop-ship location, and the claimed shipment information, including, for example, type of mail, type of pieces, class of mail, count of mail containers (e.g., pallets, bundles, trays, sacks, and the like), overall gross weight, discounts claimed, and the like.

Next, in step 305, the mailer submits to the delivery service provider data associated with the same mail shipment, such as via an EMD file to the USPS. As described above, if the mailer is a subscriber of the USPS's CONFIRM service, the mailer's EMD file may also indicate PLANET Codes that will be used on the mailing shipment for piece-level tracking. The mailer may create the EMD file by using mailer computers 120 to manually enter the EMD file through Mail Tracking & Reporting Web site provided by the USPS. The mailer may also create the EMD file containing the necessary data in accordance with EMD file specifications (e.g., EMD specification shown in FIGS. 2A-H and 2J), then upload the EMD file to the USPS using mailer computers 120. The EMD file is then uploaded into server 100 for storage in database 110.

Next, the mailer drop-ships the mail shipment with the USPS. (Step 310). This may be accomplished by the mailer delivering the mail shipment to a USPS location, for example.

Then, in step 315, the delivery service provider scans the mail shipment using mail processing equipment 130.

In step 320, server 100 determines if the mailing shipment data (e.g., drop-ship location) extracted from the mailer's PS Form 8125 matches the mailing shipment data extracted from the mailer's EMD file. If server 100 determines that the mailing shipment data in the mailer's PS Form 8125 matches the mail shipment data in the mailer's EMD file, the process proceeds to step 325. In step 325, server 100 flags as a match the mail shipment data provided by the mailer. Following step 325, server 100 determines if the mailing shipment data provided by the mailer matches the scanned mail shipment data from mail processing equipment 130. (Step 330). If the mailer-provided mailing shipment data matches the scanned mail shipment data, then the data validation and reconciliation process terminates successfully. However, if the mailer-provided mailing shipment data does not match the scanned mail shipment data, then the data validation and reconciliation process proceeds to step 380. In step 380, a data mismatch error is indicated and further evaluation of the mailer-provided data is required.

Alternatively, if in step 320 the mailing shipment data in mailer's PS Form 8125 does not match the mail shipment data in the mailer's EMD file, server 100 flags the mail shipment data provided by the mailer for validation and reconciliation. (Step 335). Next, in step 340, server 100 determines if mailing shipment data in the mailer's PS Form 8125 matches the scanned mail shipment data from mail processing equipment 130. If the mailing shipment data in the mailer's PS Form 8125 matches the scanned mail shipment data, then the process proceeds to step 345. In step 345, server flags the mailer's PS Form 8125 data as valid, and the data validation and reconciliation process terminates successfully.

However, if the mailing shipment data in the mailer's PS Form 8125 does not match the scanned mail shipment data, then the process proceeds to step 350. In step 350, server 100 determines if mailing shipment data in the mailer's EMD file matches the scanned mail shipment data from mail processing equipment 130. If the mailing shipment data in the mailer's EMD document matches the scanned mail shipment data, then the process proceeds to step 355. In step 355, server 100 flags the mailing shipment data in the mailer's EMD file as valid, and the data validation and reconciliation process terminates successfully. Alternatively, if the mailing shipment data in the mailer's EMD file does not match the scanned mail shipment data, then the data validation and reconciliation process proceeds to step 380. In step 380, a data mismatch error is indicated and further evaluation of the mailer-provided data is required.

Although the present invention was discussed above with respect to mail to be delivered by the USPS, it is to be understood that the invention may be employed with respect to other types of delivery items to be delivered by other types of delivery service providers.

Furthermore, the foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A computer-implemented method for reconciling data associated with a delivery item shipment, the method comprising:

receiving, before the shipment is provided to a shipping location, a first set of data obtained from a shipping notice of a shipper, the first set of data being associated with the shipment;

electronically receiving, by a server, before the shipment is provided to the shipping location, a second set of data obtained from an electronic data file of the shipper, the second set of data being associated with the shipment;

scanning, during processing at the shipping location, the shipment for data associated with the shipment;

determining if the first set of data from the shipper matches the second set of data from the shipper;

if the first set of data matches the second set of data, determining if the first or second set of data matches the scanned data; and if the first or second set of data matches the scanned data, indicating as valid the first set of data and the second set of data.

2. The method of claim 1, wherein the shipping notice is a hard copy form.

3. The method of claim 1, wherein the shipping notice is an electronic form.

4. The method of claim 1, wherein the data associated with the shipment includes at least one of a shipment identifier, a business entity identifier, a destination postal code, a date, a time, or a name of a processing facility.

5. The method of claim 1, wherein the step of scanning is performed by processing equipment that scans optically-readable codes from each delivery item included in the shipment.

6. The method of claim 5, wherein the optically-readable codes are at least one of a 4-state barcode, a PLANET code, or a POSTNET code.

7. A system for reconciling data associated with a delivery item shipment, the system comprising:

a server adapted to store in a database a first set of data obtained from a shipping notice of a shipper before the shipment is provided to a shipping location, the first set of data being associated with the shipment, the server being further adapted to store in the database a second set of data obtained from an electronic data file of the shipper, the second set of data being associated with the shipment and received from a computer of the shipper before the shipment is provided to the shipping location; and processing equipment adapted to scan, during processing at the shipping location, the shipment for data associated with the shipment, wherein the server is further adapted to:
      determine if the first set of data from the shipper matches the second set of data from the shipper computer, if the first set of data matches the second set of data, determine if the first or second set of data matches the scanned data, and if the first or second set of data matches the scanned data, indicate as valid the first set of data and the second set of data.

8. The system of claim 7, wherein the shipping notice is a hard copy form.

9. The system of claim 7, wherein the shipping notice is an electronic form.

10. The system of claim 7, wherein the data associated with the shipment includes at least one of a shipment identifier, a business entity identifier, a destination postal code, a date, a time, or a name of a processing facility.

11. The system of claim 7, wherein the step of scanning is performed by processing equipment that scans optically-readable codes from each delivery item included in the shipment.

12. The system of claim 11, wherein the optically-readable codes are at least one of a 4-state barcode, a PLANET code, or a POSTNET code.

13. A computer-readable medium storing program instructions for reconciling data associated with a delivery item shipment according to a method, the method comprising:

receiving, before the shipment is provided to a shipping location, a first set of data obtained from a shipping notice of a shipper, the first set of data being associated with the shipment;

electronically receiving, before the shipment is provided to the shipping location, a second set of data obtained from an electronic data file of the shipper, the second set of data being associated with the shipment;

scanning, during processing at the shipping location, the shipment for data associated with the shipment;

determining if the first set of data from the shipper matches the second set of data from the shipper;

if the first set of data matches the second set of data, determining if the first or second set of data matches the scanned data; and if the first or second set of data matches the scanned data, indicating as valid the first set of data and the second set of data.

14. The computer-readable medium of claim 13, wherein the shipping notice is a hard copy form.

15. The computer-readable medium of claim 13, wherein the shipping notice is an electronic form.

16. The computer-readable medium of claim 13, wherein the data associated with the shipment includes at least one of a shipment identifier, a business entity identifier, a destination postal code, a date, a time, or a name of a processing facility.

17. The computer-readable medium of claim 13, wherein the step of scanning is performed by processing equipment that scans optically-readable codes from each delivery item included in the shipment.

18. The computer-readable medium of claim 17, wherein the optically-readable codes are at least one of a 4-state barcode, a PLANET code, or a POSTNET code.

19. The computer-implemented method of claim 1, wherein the first set of data comprises a mailer identifier, a drop-ship location, and a quantity of delivery items.

20. A computer-implemented method for reconciling data associated with a delivery item shipment, the method comprising:

receiving, before the shipment is provided to a shipping location, a first set of data obtained from a shipping notice of a shipper, the first set of data being associated with the shipment, wherein the first set of data comprises a shipper identifier, a drop-ship location, and a quantity of delivery items;

electronically receiving, by a server, before the shipment is provided to the shipping location, a second set of data obtained from an electronic data file of the shipper, the second set of data being associated with the shipment;

scanning, during processing at the shipping location, the shipment for data associated with the shipment;

determining if the first set of data from the shipper matches the second set of data from the shipper;

if the first set of data matches the second set of data, determining if the first or second set of data matches the scanned data; and if the first or second set of data matches the scanned data, indicating as valid the first set of data and the second set of data.

\* \* \* \* \*